US012625618B2

(12) United States Patent
Pinkert et al.

(10) Patent No.: US 12,625,618 B2
(45) Date of Patent: May 12, 2026

(54) DATA PROCESSING SYSTEM FOR EFFICIENT COMMUNICATION OF LARGE QUANTITIES OF DATA

(71) Applicant: Robert Bosch GmbH, Stuttgart (DE)

(72) Inventors: Andreas Pinkert, Auenwald (DE); Arnaud Riess, Vaihingen an der Enz (DE); Karsten Muehlmann, Stuttgart (DE); Martin Hintz, Grossbottwar (DE); Tilman Sinning, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/850,168

(22) PCT Filed: Mar. 22, 2023

(86) PCT No.: PCT/EP2023/057278
§ 371 (c)(1),
(2) Date: Sep. 24, 2024

(87) PCT Pub. No.: WO2023/213470
PCT Pub. Date: Nov. 9, 2023

(65) Prior Publication Data
US 2025/0208767 A1 Jun. 26, 2025

(30) Foreign Application Priority Data
May 6, 2022 (DE) ..................... 10 2022 204 494.0

(51) Int. Cl.
G06F 12/00 (2006.01)
G06F 3/06 (2006.01)
(52) U.S. Cl.
CPC .......... G06F 3/0619 (2013.01); G06F 3/0659 (2013.01); G06F 3/0673 (2013.01)

(58) Field of Classification Search
CPC .... G06F 3/0619; G06F 3/0659; G06F 3/0673; G06F 2209/523; G06F 9/526; G06F 9/4406
(Continued)

(56) References Cited

U.S. PATENT DOCUMENTS

2008/0256267 A1* 10/2008 Inoue ...................... G06F 13/28
710/28
2012/0311300 A1 12/2012 Sundrani et al.
(Continued)

FOREIGN PATENT DOCUMENTS

CN 104904178 B * 9/2018 ............. H04L 63/20
JP 2005352839 A 12/2005
(Continued)

OTHER PUBLICATIONS

International Search Report for PCT/EP2023/057278, Issued Jun. 1, 2023.
(Continued)

*Primary Examiner* — Mardochee Chery
(74) *Attorney, Agent, or Firm* — NORTON ROSE FULBRIGHT US LLP

(57) ABSTRACT
A data processing system for processing data. The data processing system includes a data processing device having at least one processor and at least one main memory. At least one operating system and data processing modules for performing data processing tasks are operated on the data processing device. The operating system manages the data processing modules and in each case provides an interface, via which communication of the data processing modules via the operating system is possible. On the main memory, an exchange memory is provided to which direct access by at least two of the data processing modules is made possible so that these data processing modules can communicate with
(Continued)

each other without the involvement of the operating system. The exchange memory provides, for each of these data processing modules, at least one exclusive zone in which the respective data processing module has exclusive write permissions.

12 Claims, 1 Drawing Sheet

(58) Field of Classification Search
USPC .......................................................... 711/154
See application file for complete search history.

(56) References Cited

U.S. PATENT DOCUMENTS

| | | | |
|---|---|---|---|
| 2018/0321667 A1* | 11/2018 | Cella ...................... | H04B 17/29 |
| 2020/0021351 A1 | 1/2020 | Tang | |

FOREIGN PATENT DOCUMENTS

| | | |
|---|---|---|
| JP | 2006216068 A | 8/2006 |
| JP | 2019508299 A | 3/2019 |
| JP | 2019510327 A | 4/2019 |
| WO | 2017056725 A1 | 4/2017 |

OTHER PUBLICATIONS

Whiddett et al., "Distributed Programs: an Overview of Implementations," Microprocessors and Microsystems, vol. 10, No. 9, 1986, pp. 475-484.

* cited by examiner

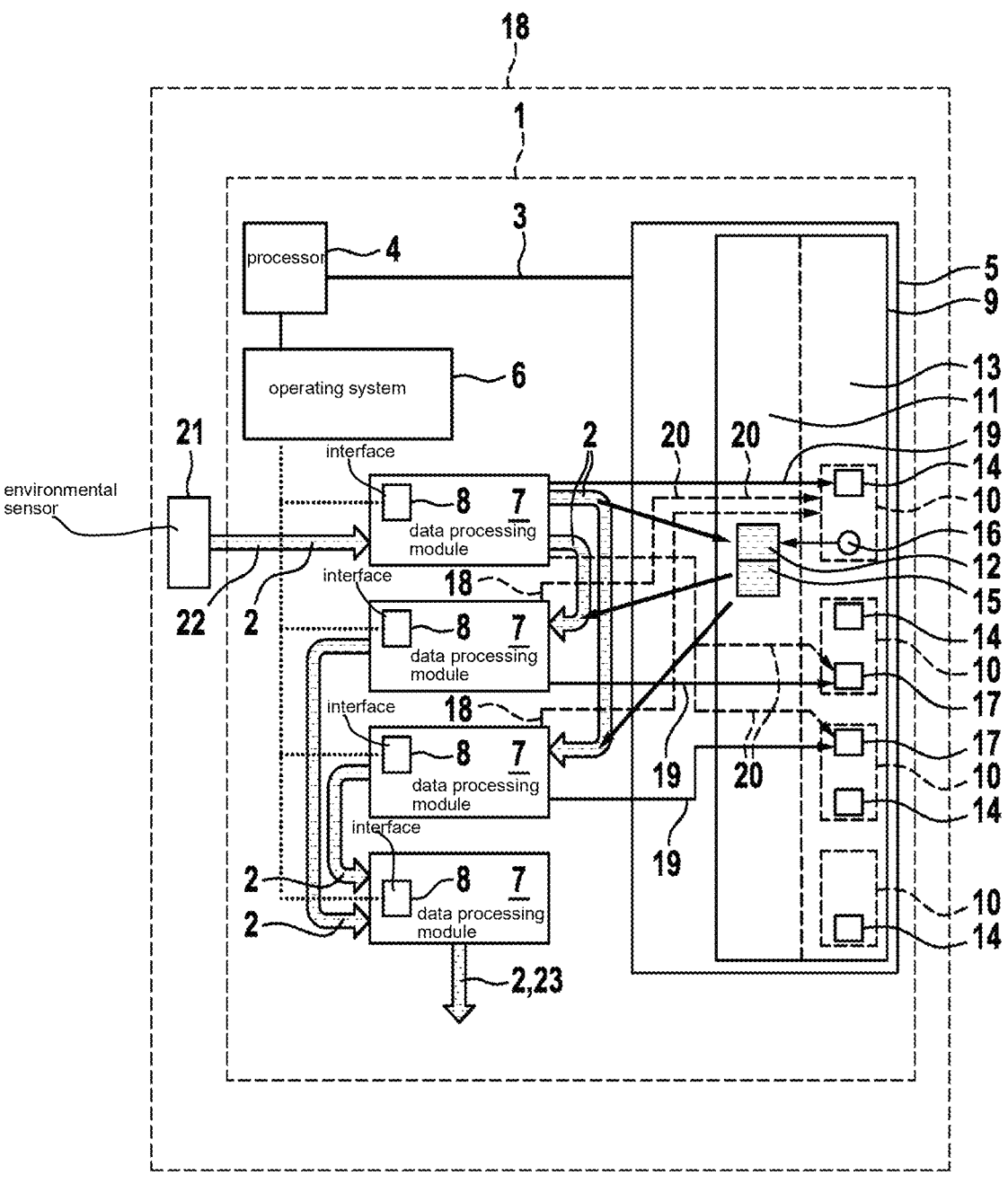

DATA PROCESSING SYSTEM FOR EFFICIENT COMMUNICATION OF LARGE QUANTITIES OF DATA

FIELD

The present invention disclosed herein relates to a data processing system for efficiently processing large quantities of data. The data processing system is in particular a data processing system for the processing of data in a motor vehicle, wherein the data processing is in particular used for functions of highly automated and, in some cases, even autonomous driving.

BACKGROUND INFORMATION

In data processing for highly automated or autonomous driving, there is regularly the special feature that extremely large quantities of data must be processed, which are, for example, produced by environmental sensors such as cameras. Cameras as environmental sensors are a typical source of very large data streams that can be used for highly automated driving functions.

The processing of such data streams typically takes place through a cascade of filters. Viewed purely from the standpoint of data storage, the quantity of data originating from the data source (e.g., a camera) is reduced more and more from filter to filter until, in the end, the information significant for the highly automated driving function, for instance, is synthesized from the data. An example could be a traffic sign recognition function that, based on camera data, recognizes traffic signs that are in the visual range of the vehicle and that are to be taken into consideration while driving. For example, a filter may recognize color values in the camera images. A further filter finds edges. Further filters recognize objects in the camera images and still further filters match objects, for example in databases of known traffic signs.

Such filters are regularly implemented as standalone programs, which, for example, may also be referred to as data processing modules and which are operated "side-by-side" on hardware managed by an operating system.

Typically, the individual data processing modules are controlled via interfaces between the programs and the operating system. Via such interfaces, monitoring parameters are also regularly communicated to the data processing modules, etc. However, such interfaces to the operating system often do not have sufficient performance to transmit the data to be processed from one data processing module to another data processing module. This is in particular true for large quantities of data, which represent output data of a data processing module, are provided to another data processing module for further processing, and which are further processed as input data by this other data processing module.

The reduced performance of such interfaces to the operating system is regularly at least partly caused by the fact that the operating system forms a level of abstraction between the underlying hardware and the data processing modules, which results in performance losses. This may be caused, for example, by the fact that data are copied during the transmission via such interfaces. Furthermore, updates (in particular updates to the operating system) may also result in changes to such interfaces that unexpectedly impair performance. This is in particular unacceptable if the performance of the data transmission from one data processing module to another data processing module is a critical parameter for the functioning of the data processing system as a whole.

In order to improve performance, in light of this, it is possible to allow the operating system to assign multiple data processing modules a common memory area on which the data processing modules can communicate directly with one other (i.e., by bypassing the operating system) and can exchange data. Such an exchange memory is preferably provided by the operating system, and the operating system may not monitor/control, or may only monitor/control to a limited extent, which data processing modules access this memory.

Such an exchange memory breaches the principle of isolation of individual programs (data processing modules) from one other. This principle is commonly implemented when operating programs on an operating system and is used for security, in particular when there may be incompatibilities between the individual programs (data processing modules). In the applications discussed here for highly automated driving of motor vehicles, this principle is somewhat less relevant than in desktop PCs, for example, because the individual data processing modules are preferably at least partially designed and tested directly and exclusively to work together directly in the overall system. The need to protect the programs from one another, such as is necessary on a desktop PC on which software from very different manufacturers is run, is not regularly required to the same extent in this application, although the requirements for isolating processes for highly automated driving will in the future become more similar to the requirements for other data processing devices, such as desktop PCs.

Indeed, as soon as the software used becomes more sophisticated, the principles of isolating individual programs (data processing modules) will again become a more important focus. The more different functions are implemented in a vehicle, the more likely it is that it will be necessary for data processing resources to be used by these different functions in parallel. In particular, if ASIL data [ASIL=automotive safety and security] are also processed or generated on a memory, it is regularly necessary to use memory protection mechanisms in order to prevent overwriting the ASIL data.

Generally, it can be assumed that the larger the domain controllers become (i.e., the more different functions are realized), the greater the need for mutual protection. Typically, if the mechanisms provided to isolate individual programs from one another are breached, this produces an unclear memory state, which is usually accompanied by a complete restart of the corresponding system with all the different programs/functions realized thereon. During a restart, none of the features provided by the controller which is being restarted is available. The larger the particular controller is (the more functions it provides), the longer the restart will take, the more functions will be unavailable during the restart and the more important it becomes to avoid the potential need for a restart, because a restart will then become very expensive/slow (in this case, full-blown computer is being rebooted, not simply a small controller) and none of the functions running on it would be available during this time.

Even so, protection against collisions when accessing an exchange memory is helpful, for example during read access and during write access. This protection can be realized, for example, by self-administration of the individual data processing modules when accessing the exchange memory. For this purpose, the data processing modules must obtain information about read accesses and write accesses by other data processing modules and must use this information during access to consider other data processing modules.

As a whole, there is still room for improvement here and a novel structure for such data processing systems is to be proposed with the data processing system described here.

SUMMARY

A data processing system of the present invention is described here for processing data. According to an example embodiment of the present invention, the data processing system includes a data processing device having at least one processor and at least one main memory, wherein at least one operating system and a plurality of data processing modules for performing data processing tasks are operated on the data processing device, wherein the operating system is configured to manage the data processing modules and in each case provide an operating system interface, via which communication of the data processing modules via the operating system is made possible, wherein the data processing device further provides, on the main memory, an exchange memory to which direct access by at least two of the data processing modules is made possible so that these data processing modules can communicate with each other without the involvement of the operating system, wherein the exchange memory provides, for each of these data processing modules, at least one exclusive zone in which the respective data processing module has exclusive write permissions in order to be able to communicate messages to other data processing modules without potential write access collisions.

According to an example embodiment of the present invention, the data processing device is the hardware on which the described data processing system is operated. Preferably, this hardware comprises a plurality of individual processor cores, and, if necessary, the main memory of such a data processing device also consists of a plurality of individual memories. The entirety of all elements, such as processors, main memory, etc., is also referred to here as the "system resources." The individual processors and processor cores may be optimized for different tasks. The same applies to the main memory, which does not need to have a monolithic structure but can have different types of memory for different tasks. Where appropriate, individual processors or processor cores and/or memory or memory areas may also be reserved for particular data processing tasks and/or for operating particular data processing modules. If necessary, system resources may also be used for test functions running in the background.

According to an example embodiment of the present invention, the operating system is preferably responsible for managing and assigning the individual system resources to the data processing modules. The operating system is preferably specifically configured for the type of data processing performed with the data processing system described. Preferably, the operating system and the individual data processing modules together form a data processing structure that makes it possible to perform the respective data processing task with the data processing device. Preferably, installation of data processing modules other than those necessary to perform the data processing tasks is not provided. Instead, the data processing structure as a whole is a self-contained system. For this reason, the exchange memory can also be provided in violation of the principle of isolation, without this compromising higher-level interests of system security.

The data processing system is generally suitable for processing a wide variety of types of data, wherein there is a focus on the above-mentioned processing of large quantities of data with a cascade of data processing modules (filters).

The operating system interfaces are used to access the individual data processing modules during operation of the overall system. For example, access to the data processing modules via the operating system interfaces may be understood as "front" access or "official" access to the data processing modules.

The exchange memory forms a kind of background channel for rapid communication between the data processing modules. This background channel is preferably not provided for access from outside (from the operating system) to the data/information provided by the data processing modules, but instead, data are exchanged here in the background with a particularly good level of performance (storing output data of data processing modules and these data being read in by other data processing modules as input data).

According to an example embodiment of the present invention, the special feature of the data processing system described here is that respective exclusive zones for individual data processing modules are provided in the exchange memory, in which exclusive zones the respective data processing modules have exclusive write access. These exclusive zones are preferably provided (assigned) by the operating system, and, particularly preferably, the operating system also monitors to ensure that there is no unauthorized write access by other data processing modules to these exclusive zones. If applicable, such unauthorized write access is only detected and a troubleshooting process is initiated if such unauthorized write access occurs. Such a troubleshooting process may include, for example, restarting the data processing system as a response. In other instances, such unauthorized write access may also be actively prevented. This is in particular the case if the data processing system has a high ASIL rating. In this case, it is regularly necessary to completely avoid unauthorized write access such that restarts do not even become necessary.

According to an example embodiment of the present invention, preferably, the exclusive zones may be read by other data processing modules that have access to the exchange memory (particularly preferably by all data processing modules that have access to the exchange memory). This means that these data processing modules have read permissions for the exclusive zones. The exclusive zones allow data processing modules to securely transmit information that cannot be compromised, to other data processing modules. In this respect, the exclusive zones are monitored by the other data processing modules, which are to further process information from the respective data processing module. This can take place in a time-controlled manner (for example, regularly) and/or in an event-driven manner (as a result of a particular message or event).

Establishing the exclusive zones described makes it possible, on the one hand, to fully utilize the positive effects of the high performance of the described exchange memory. On the other hand, data collisions in the exchange memory can be avoided in an efficient manner.

According to an example embodiment of the present invention, particularly preferably, the exchange memory comprises a processing data area for providing output data and a control data area for providing control data, wherein each of the exclusive zones comprise portions of the control data area.

In preferred design variants of the present invention, exclusive zones may also comprise portions of the processing data area. Additional exclusive zones may also be provided in the processing data area. This may in particular be advantageous for protecting processing data from erroneous read processes.

According to an example embodiment of the present invention, preferably, the data that are processed with the described data processing system are stored in the processing data area. These include, for example, image data from cameras, data relating to edges found in such image data, etc. The control data area stores data for communication between the data processing modules, for example, flags, triggers, status messages, and so forth. Preferably, the processing data area is larger (that is, configured to store a significantly larger quantity of data) than the control data area. In design variants, the processing data area and the control data area may also be provided on different hardware (on different hardware memory elements).

According to an example embodiment of the present invention, particularly preferably, at least one data processing module is configured to provide, in the exchange memory, output data that are taken by a plurality of further data processing modules as input data from the exchange memory.

According to an example embodiment of the present invention, particularly preferably, 1:n communication from one data processing module to a plurality of other data processing modules takes place in the data processing system at least at one point. Such 1:n communication is an essential strength of using the exchange memory for communication between data processing modules.

According to an example embodiment of the present invention, particularly preferably, output data from the plurality of further data processing modules are further processed as input data directly from the processing data area, and no copy of the output data is preferably made.

The output data are thus read as input data directly where they were stored in hardware. In particular, output data are not copied to input data. Such copying operations are regularly part of a communication taking place via operating system interfaces, and such communication typically ties up a large amount of resources such as bandwidth and processor core usage.

According to an example embodiment of the present invention, particularly preferably, at least one data processing module is configured to provide output data in the processing data area and pointers to the output data as control data in the control data area, which pointers can be used by further data processing modules to access the output data.

According to an example embodiment of the present invention, preferably, access points to the data stored in the processing data area are thus provided via the control data area and are realized as pointers. The term "pointer" is used here as an overarching term. In particular, a pointer includes an address at which certain data can be accessed. Pointers may in particular also be multi-stage, thereby allowing efficient access to larger data structures in the processing data area. More complex indices (indexed accesses) can also be understood as "pointers." Pointers can also be defined relatively and, for example, define distances between data at a storage location.

According to an example embodiment of the present invention, particularly preferably, pointers to the output data are provided by a data processing module in an exclusive zone assigned to it.

Such pointers may thus preferably not be compromised by write accesses by other data processing modules.

According to an example embodiment of the present invention, particularly preferably, data processing modules are configured to store status messages in the respectively assigned exclusive zone.

According to an example embodiment of the present invention, particularly preferably, data processing modules configured to receive output data of other data processing modules are also configured to deliver a status message, which confirms receipt of the output data, in the exclusive zone respectively assigned to them, when the receipt of output data has been completed.

For example, status messages may serve to communicate that individual data processing tasks from certain data processing modules (for example, reading certain data) are completed. By providing status messages in exclusive zones, it can be ensured that such status messages can also be received by other data processing modules.

According to an example embodiment of the present invention, particularly preferably, the exchange memory with the exclusive zones on the data processing device is provided by the operating system.

By providing the exclusive zones through the operating system, a high level of security can be ensured against the compromising of data exchanged via the exchange memory.

According to an example embodiment of the present invention, particularly preferably, at least one data processing module is configured to monitor exclusive zones of other data processing modules in order to receive status messages of the other data processing modules.

According to an example embodiment of the present invention, particularly preferably, a data processing system is configured to perform data processing tasks for operating a motor vehicle.

However, the described data processing systems may also be used for entirely different tasks, for example, for controlling and monitoring manufacturing processes.

In addition, the data processing system is preferably configured to perform data processing tasks for processing environmental data of a motor vehicle.

The data processing system is in particular suitable for performing data processing tasks for highly automated, where appropriate autonomous, driving of a motor vehicle.

The data processing system described and the technical environment are explained in more detail below with reference to the FIGURE.

BRIEF DESCRIPTION OF THE DRAWING

FIG. 1 shows a preferred embodiment example of the present invention.

DETAILED DESCRIPTION OF EXAMPLE EMBODIMENTS

FIG. 1 shows a described data processing system 1 in a schematic illustration depicting various aspects of the processing of data 2 with such a data processing system 1.

The data processing of data 2 with the data processing system 1 is preferably carried out by sequential processing of the data 2 in a plurality of data processing modules 7. The data 2 are, for example, environmental data 22 acquired, for example, in an environment of a motor vehicle 18 with environmental sensors 21 and processed with the data processing system 1 in order to generate system output data 23 used in the motor vehicle 18, for example, to ensure autonomous driving operation of the motor vehicle 18. Preferably, each data processing module 7 performs sub-tasks of data processing in order to generate the desired system output data 23 based on the data provided (e.g., environmental data 22). If the environmental data 22 are, for example, camera data from a camera and the data processing system 1 is to ensure traffic sign recognition, for example, then the system output data 23 are, for example, data 2 relating to the recognized traffic signs. In this case, for example, certain data processing modules 7 carry out feature registration in the camera data. Other data processing modules 7 match prepared camera data with available map data and/or a database with stored information about traffic signs. The data processing tasks mentioned are provided as examples. In practice, many further data processing tasks are usually required in order to ultimately generate the desired system output data 23. Preferably, the individual data processing tasks are respectively performed by a data processing module 7, and, particularly preferably, there is ongoing processing of new available input data at all times (in this case, camera data) in order to permanently provide system output data 23 so that the desired information (e.g., the information regarding traffic signs captured with the cameras) is continuously available and highly current. That is to say, each data processing module 7 preferably performs the data processing task, for which it is configured, again and again and in each case generates new output data 12, which are then processed as input data 15 by other data processing modules 7 performing subsequent data processing tasks.

The data processing system 1 is operated on a data processing device 3, which comprises at least one processor 4 and at least one main memory 5. The data processing device 3 is shown here schematically as a connection between a processor 4 and main memory 5 because, in the representation chosen here, functional system level components (the data processing system 1) and hardware components (the data processing device 3 with the processor 4 and the main memory 5) are shown together. The at least one processor 4 provides computing capacity that can be used for a variety of processes, and the at least one main memory 5 can store variables, system states and program components underlying the processes. The representation of the data processing device 3 is greatly simplified and schematic here. Preferably, the described data processing system 1 in particular comprises a plurality of processors 4, and extensive data processing tasks for processing large quantities of data can preferably be performed in parallel by means of the described data processing system 1. Multiple main memories 5 or multiple main memory modules may also be provided.

An operating system 6 is operated on the data processing device 3, manages the system resources of the data processing device 3 (in particular the computing power of the at least one processor 4 and the main memory 5) and provides them to the processor 4 operated on the data processing device 3.

The data processing tasks for processing data 2 are performed by data processing modules 7. The operation of the data processing modules 7 is controlled by the operating system 6. Each data processing module 7 has an interface 8 to the operating system 6. The data processing module 7 can be started, controlled and, if necessary, also terminated via the interface 8. Typically, information is exchanged between individual data processing modules 7 via the operating system 6. When a data processing module 7 has completed a data processing task, it may be configured to provide output data 12 to other data processing modules 7 via the interface 8 and the operating system 6.

The communication between data processing modules 7 via interfaces 8 to the operating system 6 or via the operating system 6 is regularly relatively slow. In particular, when communicating data 2 via such interfaces 8, it is regularly necessary for the data 2 to be copied in the main memory 5. When transmitting data 2 via such interfaces 8, a plurality of hardware accesses typically takes place in the background that do not occur in a direct read and/or write access to a memory. Furthermore, the processes during the communication via such interfaces 8 are controlled by the operating system 6. Updates to the operating system 6 may result in a large change in the performance of the data processing system 1 when interfaces 8 provided by the operating system 6 are used for the communication of data 2, in particular when large quantities of data are communicated via these interfaces 8.

In order to ensure faster communication of data 2 between data processing modules 7 of the data processing system 1, an exchange memory 9 is provided in the main memory 5, via which exchange memory the individual data processing modules 7 can directly exchange data 2, wherein the operating system 6 and interfaces 8 provided by the operating system 6 are bypassed. The representation of exactly one exchange memory 9 is highly simplified here. In fact, the exchange memory 9 can be structured in a complex manner and can have a multitude of memory areas and zones. This makes a more efficient exchange of data 2 possible, which is also above all not influenced when changes to the operating system 6 occur, for example due to updates.

The exchange memory 9 is preferably allocated to the data processing modules 7 by the operating system 6.

The exchange memory 9 preferably has two sub-areas, namely a processing data area 11 and a control data area 13. In the processing data area 11, the actual data 2 processed with the data processing modules 7 are stored as output data 12 and also read as input data 15 by further data processing modules 7. Control data 14 are preferably stored in the control data area 13 and serve to control the communication between the data processing modules 7. These include, for example, status messages 17, which are used by data processing modules 7 to communicate information to other data processing modules 7 and which may also represent control data 14. For example, status messages 17 may be used to communicate that new output data 12 have been generated, which other data processing modules 7 can process further as input data 15. Status messages 17 may also be used by data processing modules 7 to communicate, for example, that the reading of input data 15 by the respective data processing module 7 has been completed. Pointers 16 to the data 2 stored in the processing data area 11 are preferably transmitted as control data 14. The data 2 stored as output data 12 in the processing data area 11 are preferably not copied for use as input data 15 in other data processing modules 7, but instead physically the same data 2 are accessed directly. Copy operations of output data 12 to input data 15 always require copying time, which can be saved by this approach.

Exclusive zones 10, each of which is assigned to a data processing module 7 and to which the respectively assigned data processing module 7 has exclusive write access 19, are preferably configured within the exchange memory 9. The exclusive zones 10 can be arranged in the control data area 13 of the exchange memory 9. However, the exclusive zones 10 can also extend across the control data area 13 and the processing data area 11, or the exclusive zones 10 can each be divided into a (separate) control data area 13 and a (separate) processing data area 11. Other data processing modules 7 respectively have read-only access 20 to this exclusive zone 10. Preferably, data processing modules 7 respectively monitor exclusive zones 10 of other data processing modules 7 with which they communicate to accomplish their data processing tasks, in order to receive control data 14 from these data processing modules 7. Control data 14 that data processing modules 7 need to communicate to other data processing modules 7 are in each case written by these data processing modules 7 to the exclusive zone 10 assigned to them.

The structure of the processing data area 11, the control data area 13 and the exclusive zones 10 is preferably not predetermined by the operating system 6 but rather managed by the data processing modules 7 themselves. However, this structure is secured by the operating system so that no undesirable access to exclusive zones 10 is possible.

The described features with the exclusive zones 10 within the exchange memory 9 not monitored by the operating system 6 can be used to realize very rapid and highly efficient data processing in a system with a multitude of data processing tasks which build on one other, wherein a high degree of security against data collisions is also achieved by the exclusive zones 10.

LIST OF REFERENCE SIGNS

1. Data processing system
2. Data
3. Data processing device
4. Processor
5. Main memory
6. Operating system
7. Data processing module
8. Interface
9. Exchange memory
10. Exclusive zone
11. Processing data area
12. Output data
13. Control data area
14. Control data
15. Input data
16. Indexed access
17. Status messages
18. Motor vehicle
19. Write access
20. Read access
21. Environmental sensor
22. Environmental data
23. System output data

The invention claimed is:

1. A data processing system for processing data, comprising:

a data processing device having at least one processor and at least one main memory, wherein at least one operating system and a plurality of data processing modules configured to perform data processing tasks are operated on the data processing device, wherein the operating system is configured to manage the data processing modules and in each case provide an interface, via which communication of the data processing modules via the operating system is made possible, wherein the data processing device further provides, on the main memory, an exchange memory to which direct access by at least two of the data processing modules is made possible so that the at least two data processing modules can communicate with each other without involvement of the operating system, wherein the exchange memory includes, for each respective data processing module of the at least two data processing modules, at least one exclusive zone in which the respective data processing module has exclusive write permissions in order to be able to communicate messages to other ones of the data processing modules without potential write access collisions.

2. The data processing system according to claim 1, wherein the exchange memory includes a processing data area for providing output data and a control data area for providing control data, wherein the exclusive zones each include portions of the control data area.

3. The data processing system according to claim 2, wherein at least one of the data processing modules is configured to provide, in the exchange memory, output data that are taken by a plurality of further data processing modules as input data from the exchange memory.

4. The data processing system according to claim 3, wherein output data from the plurality of further data processing modules are further processed as input data directly from the processing data area, and no copy of the output data is made.

5. The data processing system according to claim 3, wherein at least one data processing module is configured to provide output data in the processing data area and pointers to the output data as control data in the control data area, wherein the pointers can be used by further data processing modules to access the output data.

6. The data processing system according to claim 5, wherein pointers to the output data are provided by a data processing module in an exclusive zone assigned to it.

7. The data processing system according to claim 1, wherein each of the at least two data processing modules are configured to store status messages in its respective exclusive zone.

8. The data processing system according to claim 7, wherein data processing modules configured to receive output data of other data processing modules are also configured to deliver a status message, which confirms receipt of the output data, in an exclusive zone respectively assigned to them, when receipt of output data has been completed.

9. The data processing system according to claim 1, wherein the exchange memory with the exclusive zones on the data processing device is provided by the operating system.

10. The data processing system according to claim 1, wherein at least one data processing module is configured to monitor exclusive zones of other data processing modules in order to receive status messages of the other data processing modules.

11. The data processing system according to claim 1, wherein the data processing system is configured to perform data processing tasks for operating a motor vehicle.

12. The data processing system according to claim 1, wherein the data processing system is configured to perform data processing tasks for processing environmental data of a motor vehicle.

* * * * *